Figure 1:
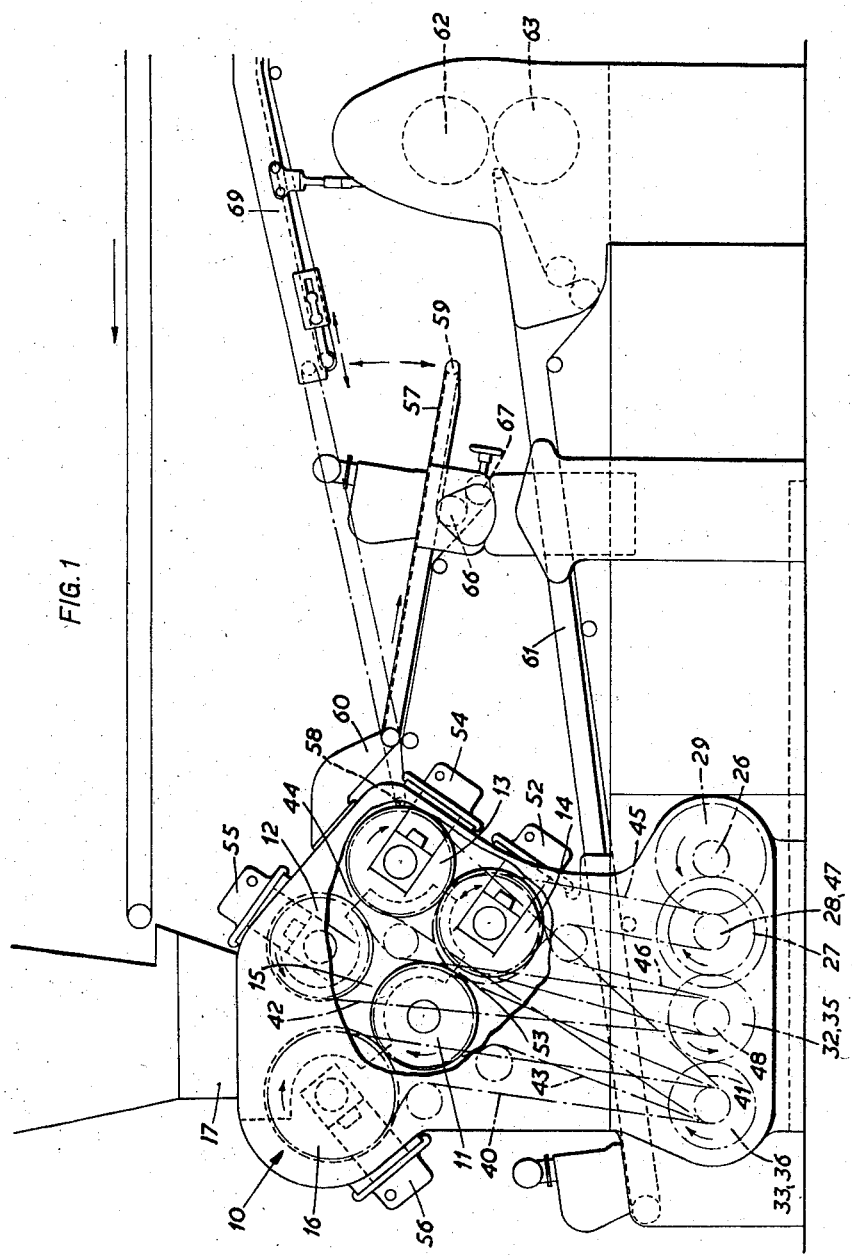

Jan. 20, 1959  J. F. NAYLOR  2,869,483
TREATMENT OF EDIBLE PLASTIC MATERIAL
Filed July 22, 1954  2 Sheets-Sheet 1

Inventor
JOSEPH FRANCIS NAYLOR
By
Mead, Browne, Schuyler & Beveridge.
Attorneys

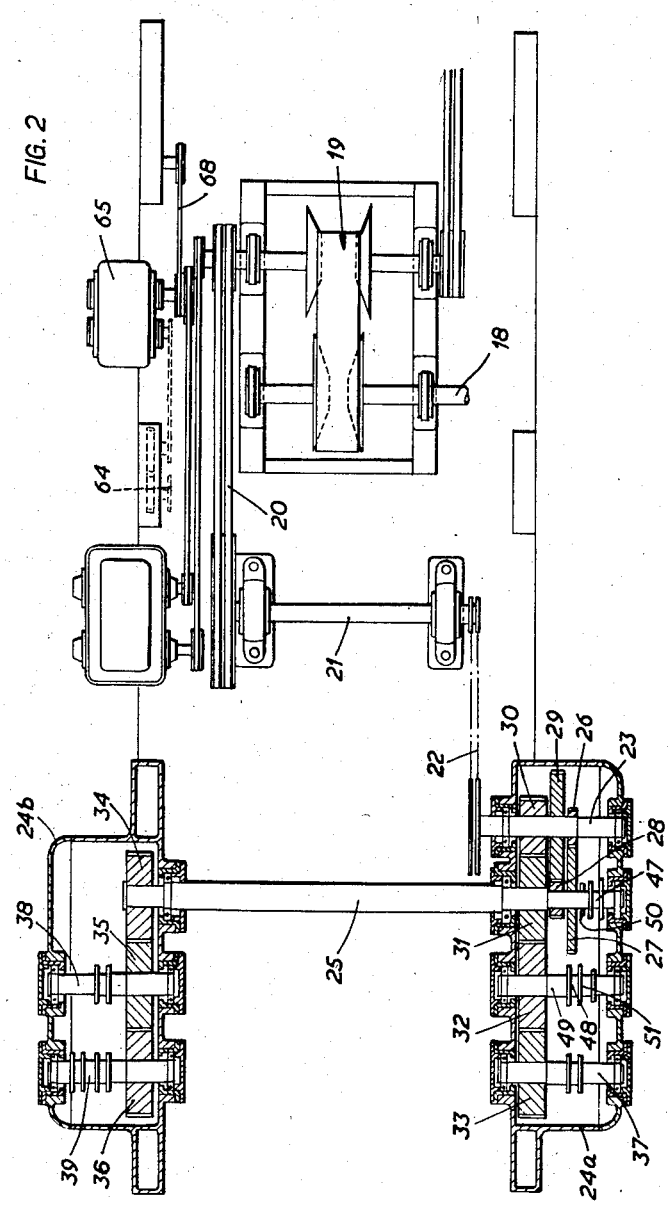

United States Patent Office 2,869,483
Patented Jan. 20, 1959

2,869,483

TREATMENT OF EDIBLE PLASTIC MATERIAL

Joseph Francis Naylor, Newton-le-Willows, England, assignor to T. & T. Vicars Limited, Newton-le-Willows, England, a British company Application July 22, 1954, Serial No. 445,063

Claims priority, application Great Britain July 25, 1953

5 Claims. (Cl. 107—12)

The present invention relates to the sheeting or moulding of edible plastic materials, such as dough, and is restricted to a type of machine within which an edible plastic material is fed to a compression space formed between a number of rotating rollers.

An object of the invention is to provide a machine of the type referred to which is adaptable to deliver various numbers of sheets, for example one sheet or two separate sheets.

According to the present invention, of at least four rollers rotatable on parallel axes embodied in a machine of the type referred to, a first and a second roller are diagonally opposed across the compression space and rotate in the same direction and a third roller is spaced both from the first roller and from the second roller to provide between itself and the first roller an inlet gap for admission of the plastic material and between itself and the second roller an outlet gap for the delivery of sheeted material from the compression space, the third roller being rotated oppositely to the first and second rollers in a direction such that its periphery urges the material through the inlet passage into said space, whilst a fourth roller can be rotated in either one direction or the other and can be adjusted relatively to the first roller in a manner establishing or preventing the delivery of a second sheet of the material. It is to be understood that comparisons between the directions of rotation of the individual rollers relate to sense of rotation, clockwise or anti-clockwise, when viewed from the same side.

The two sheets produced when the machine is operating double sheet delivery may be united subsequently to form a single continuous sheet or may be brought together to sandwich a filling applied therebetween, whereas the sheet produced by single sheet delivery would be utilized otherwise, and may for example be cut and/or embossed. Thus different devices may be used in conjunction with the present machine depending on whether it is operating single or double sheet delivery. Preferably, therefore, conveyor means adapted to receive the sheet delivered from the outlet gap between the third and second rollers is adjustable to a first position so situated relative to a second conveyor means adapted to receive the second sheet as to lay one sheet over the other, and to a second position wherein the sheet conveyed thereby is transferred to further working devices.

The direction of feed of the material for admission through the inlet gap may be horizontal from a conveyor or substantially vertical from a hopper. Especially where the latter pertains in order to assist gravity feed, it is preferred to provide a fifth roller on an axis parallel to those of the aforementioned four rollers and located to one side of the inlet gap close to the first, the fifth roller being rotated in the same direction as the adjacent first roller whereby to urge the material to the inlet gap by frictional contact of the material over its periphery. The fifth roller may be fluted or serrated on its peripheral surface in order that the movement thereof may be impressed more effectively on the material.

The invention will be further described with reference to the embodiment thereof in a dough sheeting machine, taken by way of example, which is illustrated diagrammatically in the accompanying drawings.

In the drawings:

Fig. 1 is a side view of the machine with a portion of the frame cut-away to reveal in full several of the rollers, and Fig. 2 is a plan view illustrating the drive arrangement in the base of the machine.

Two intake rollers 11 and 12 (hereinbefore referred to as first and third rollers respectively), a roller 13 (the second roller), and an adjustable roller 14 (the fourth roller) form between their mutually opposing peripheries a compression space designated generally 15, all the rollers being mounted for rotation with their axes parallel and horizontally disposed in a frame 10. The rollers 11 and 12 are spaced apart relatively to provide between their peripheries an inlet passage to the compression space 15, and a continuation of this passage between the peripheries of the roller 12, and a feed roller 16 (the fifth roller quoted previously) opens out beneath a vertical hopper 17.

The rollers are driven as follows:

A motor (not shown) is coupled with a shaft 18 (Fig. 2) which is arranged to transmit drive through a variable pitch pulley arrangement 19, a belt drive 20, an intermediary shaft 21 and a chain drive 22 to a stub shaft 23. The stub shaft 23 is one of a series of like shafts journalled on ball bearings within drive casings 24a, 24b mounted at opposite sides of the frame 10. A transverse shaft 25 transmits drive between the two oppositely disposed drive casings. A pinion 26 fixed on the stub shaft 23 meshes with a gear wheel 27 which, fixedly connected with a pinion 28, is loose on an extension of the transverse shaft 25 acting with respect to the stub shaft 23 as a lay shaft. The drive is returned on to the stub shaft 23 by a gear wheel 29 fixed to a spur gear 30, both the latter being rotatable about the stub shaft 23. The drive is arranged to impart to the spur gear 30 an anti-clockwise direction of rotation, as seen in Fig. 1, and the rotation of this spur gear is applied to a train of spur gears 31, 32, 33, meshing in that sequence, to thereby rotate the gear 31 clockwise, the gear 32 anti-clockwise, and the gear 33 clockwise, all these directions being taken with respect to Fig. 1. By the transverse shaft 25, spur gears in the other drive casing 24b are also rotated, 34 clockwise, 35 anti-clockwise, and 36 clockwise, also with respect to Fig. 1. On each of shafts 37 and 38, on which the spur gears 33 and 35 are mounted respectively, is fixed a sprocket, while on shaft 39, to which the spur gear 36 is mounted, are fixed two spaced sprockets, and from these sprockets chains pass to the rollers, guided as necessary in each case into convenient unobstructed paths by intermediary jockey sprockets. The chain 40 driving the roller 16 and the chain 41 driving the roller 13 pass about the two sprockets on the shaft 39. The chain 42 driving the roller 12 passes about the sprocket on the shaft 38, and the chain 43 driving the roller 11 passes about the sprocket on the shaft 37.

Thus, the rollers 11, 12, 13 and 16 may be set in rotation in the directions indicated by arrows in Fig. 1, so that the direction of movement of the mutually opposed portions of the peripheries of the rollers 12 and 16, and that of 11 and 12, is towards the compression space 15, whereby dough received from the hopper 17 is urged, by contact with the said peripheries, through the inlet gap and into the compression space 15. The periphery of the roller 16 may be fluted or serrated to grip dough coming into contact therewith, and thereby to exert a better feeding action on the dough. The rotation of the roller 13 is such that the immediately adjacent portions of the peripheries of this roller and the roller 12 move in substantially the same direction to deliver a first dough sheet through an outlet gap 44 formed between them.

The roller 14 is arranged to be driven by a chain 45 or a chain 46, the former passing about a sprocket 47 on the extension of the transverse shaft 25, and the latter passing about a sprocket 48 on a shaft 49 on which the spur gear 32 is mounted. The sprockets 47 and 48 are loose on their respective shafts, but there is associated with each a clutch indicated at 50 or 51, as the case may be, which may be operated selectively to establish a driven connection of the sprocket with the shaft. In this way the roller 14 can be rotated in either direction, and it is further displaceable adjustably, for instance by a screw device denoted generally 52, substantially along a line drawn between its centre and that of the roller 11. The roller 14 may therefore be adjusted to take up a "delivery" position illustrated in full lines in Fig. 1, in which position it is closely proximate to the roller 13 yet clear of the roller 11 to provide between itself and that latter roller an outlet gap 53. In order that a sheet of dough may be delivered through this outlet gap 53, rotation of the roller 14 must be such that the immediately adjacent portions of the peripheral surfaces of the rollers 11 and 14 move in substantially the same direction which occurs when the roller 14 is rotated anti-clockwise as seen in Fig. 1, that is to say drive therefor is derived from the sprocket 48 by engagement of the clutch 51, the clutch 50 being naturally disengaged.

Alternatively, the roller 14 may be adjusted into a "non-delivery" position illustrated by broken lines in Fig. 1, in which it is closely proximate to both the rollers 11 and 13, and by rotation clockwise in this position by engagement of clutch 50 and disengagement of clutch 51, the delivery of a second sheet of dough is prevented. It may be noted here that reference to the rollers being closely proximate is to be taken to mean a clearance which, with opposed movement of the surfaces defining the clearance, prevents the passage of the plastic material through the clearance.

It will be evident that many forms of drive reversing device could be used in conjunction with the roller 14, and it should be understood that the invention is in no way limited to the form which is both illustrated and particularly described herein. Also the fact that adjustment of the roller 14 is described in particular detail is not to imply that relative adjustment of the other rollers, for instance, by the devices indicated 54, 55, 56 for rollers 13, 12 and 11 respectively, may not be included for the purpose of varying the feed and thickness of the sheet of plastic material delivered.

In order that the versatility of the apparatus may be fully utilised and applied particularly to the continuous manufacture of baked dough confectionery, it is preferred to provide, associated with the outlet gap 44, a conveyor means which is adjustable as to the direction of conveying. Such a conveyor means is shown in the example as an endless conveyor belt 57 which is lapped about terminal rollers 58, 59, the latter being carried by a frame pivotally mounted to a bracket 60. A further conveyor belt 61 has an upper run extending below the bank of rollers and inclined slightly upwards to a pair of squeeze rollers 62, 63. Drive for the conveyor belt 57 is taken by means of a chain from a sprocket 64 driven through the intermediary of a gear box 65 from the variable pitch pulley arrangement 19, and this chain may pass about a sprocket fixed to either one of the rollers 66, 67 about which the pulley passes. To compensate for movement of the frame carrying the roller 59, a post, screw or the like serving to set the position of this frame may also carry a jockey pulley about which the chain passes. Drive for the conveyor belt 61 may also be taken from the gear box 65 by the chain 68.

As will be evident from the drawings, the conveyor belt 57 is adjustable between two positions. The first position, where this conveyor belt is shown in full lines, is intended for operating double sheet delivery whereby dough received on the belt 57 from the outlet gap 54 is overlaid on the second sheet conveyed on the belt 61 from the outlet gap 53. While the second sheet is conveyed forwardly on the belt 61, and prior to laying of the first sheet thereon, a composition such as "centre" consisting of agglomerated flour and fat, may be applied to the upper surface thereof to become interleaved between the two sheets as they pass through the squeeze rollers 62, 63.

In the second position of the conveyor belt 57, shown in Fig. 1 by broken lines, feed of the dough sheet conveyed thereby is to a receiving conveyor 69, whose terminal edge may be advanced or retracted to allow adjustment of the belt 57 from the first to the second position, and vice versa. The receiving conveyor 69 may be used to convey the sheet to further working devices.

I claim:

1. An apparatus for sheeting edible plastic material such as dough, comprising a frame, at least four rollers journalled on parallel axes in said frame and bounding by the mutually opposed portions of their peripheral surfaces a compression space; a first and a second of said rollers diagonally opposed across said compression space, a third one of said rollers spaced both from said first roller and from said second roller to provide between itself and said first roller an inlet gap for admission of the plastic material and between itself and said second roller an outlet gap for delivery from said compression space of a sheet of the material, and a fourth one of said rollers adjustable to a non-delivery position closely proximate to both said first and second rollers and to a delivery position spaced from said first roller to provide therebetween a further outlet gap for delivery from said compression space of another sheet of the material; feed means for feeding the plastic material to said inlet gap, and driving means adapted to rotate said first and second rollers in the same direction and said third roller in the opposite direction whereby to urge the material received from said feed means into said compression space, said driving means being further adapted to rotate said fourth roller in the same direction as said first and second rollers when in said non-delivery position and in the same direction as said third roller when in said delivery position.

2. An apparatus for sheeting edible plastic material such as dough, comprising a frame, at least four rollers journalled on parallel axes in said frame and bounding by the mutually opposed portions of their peripheral surfaces a compression space; a first and a second of said rollers diagonally opposed across said compression space, a third one of said rollers spaced both from said first roller and from said second roller to provide between itself and said first roller an inlet gap for admission of the plastic material and between itself and said second roller an outlet gap for delivery from said compression space of a sheet of the material, and a fourth one of said rollers adjustable to a non-delivery position closely proximate to both said first and second rollers and to a delivery position spaced from said first roller to provide therebetween a further outlet gap for the delivery from said compression space of another sheet of the material; feed means for feeding plastic material to said inlet gap, a motor, drive transmission between said motor and said rollers adapted to rotate said first and second rollers in the same direction and said third roller in the opposite direction whereby to urge the material received from said feed means into said compression space, said drive transmission to said fourth roller including drive reversing means to enable said fourth roller to be rotated in the same direction as said first and second rollers when in said non-delivery position and in the same direction as said third roller when in said delivery position.

3. An apparatus according to claim 2 wherein said drive reversing means consists of two shafts, meshing gear wheels fixed respectively on said shafts, a loose element on each of said shafts drivingly connected with said fourth roller, and a clutch associated with said loose element adapted to engage and disengage selectively a driven connection between said loose element and the respective shaft.

4. In an apparatus for sheeting edible plastic material such as dough, a frame, at least four rollers journalled on parallel axes in said frame and bounding by the mutually opposed portions of their peripheral surfaces a compression space; a first and a second of said rollers diagonally opposed across said compression space; a third one of said rollers spaced both from said first roller and from said second roller to provide between itself and said first roller an inlet gap for admission of the plastic material, and to provide between itself and said second roller an outlet gap for delivery from said compression space of a sheet of the material; and a fourth one of said rollers being adjustable to a non-delivery position closely proximate to both said first and second rollers and to a delivery position spaced from said first roller to provide therebetween a further outlet gap for delivery from said compression space of another sheet of the material; and driving means for rotating said first and second rollers in the same direction, and in that direction which permits plastic material to be fed into said compression space through said inlet gap, and said third roller in the opposite direction, and for rotating said fourth roller in the same direction as said first and second rollers when said fourth roller is in its said non-delivery position, and for rotating said fourth roller in the same direction as said third roller when said fourth roller is in its said delivery position.

5. An apparatus according to claim 4, including a fifth roller adapted for rotation by said driving means in the same direction as, and disposed closely adjacent to, said first roller.

References Cited in the file of this patent

UNITED STATES PATENTS

| | | |
|---|---|---|
| 2,130,097 | Loose et al. | Sept. 13, 1938 |
| 2,264,115 | Grainger et al. | Nov. 25, 1941 |
| 2,642,014 | Crosland et al. | June 16, 1953 |

FOREIGN PATENTS

| | | |
|---|---|---|
| 662,975 | Great Britain | Dec. 12, 1951 |